Dec. 5, 1967
W. W. SWANSON
3,356,268
MEASURING AND DISPENSING CANISTER
Filed March 28, 1966
2 Sheets-Sheet 1
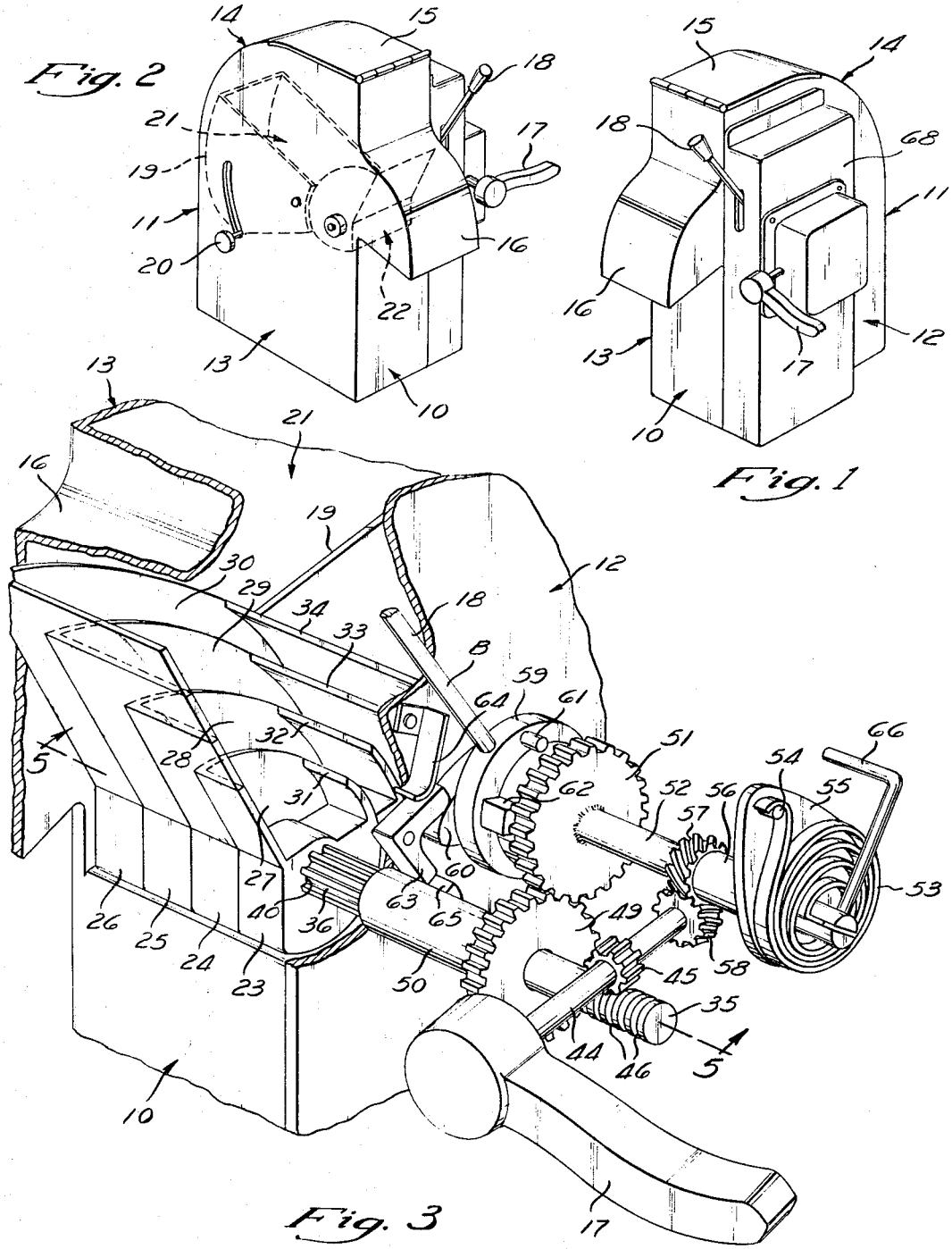
INVENTOR.
WILLIAM W. SWANSON
BY Bosworth, Sessions,
Herrstrom & Knowles
ATTORNEYS Dec. 5, 1967     W. W. SWANSON     3,356,268
MEASURING AND DISPENSING CANISTER
Filed March 28, 1966     2 Sheets-Sheet 2

INVENTOR.
WILLIAM W. SWANSON
BY Bosworth, Sessions,
Herrstrom & Knowles
ATTORNEYS

United States Patent Office 3,356,268
Patented Dec. 5, 1967

3,356,268
MEASURING AND DISPENSING CANISTER
William W. Swanson, 2515 Overlook Road, Apt. 15,
Cleveland Heights, Ohio 44106
Filed Mar. 28, 1966, Ser. No. 537,789
12 Claims. (Cl. 222—288)

ABSTRACT OF THE DISCLOSURE

A measuring and dispensing device and particularly a canister-like apparatus for storing a bulk quantity of a loose dry material and for measuring and dispensing preselected amounts of material from storage.

---

My invention is especially useful today in view of the large number of foods and beverages presented to the consumer in powdered or loose dry form. To an increasing extent, food prepared in the home, for example, is prepared almost solely from or includes powdered or loose ingredients. Because they are easy and convenient to keep and require only a relatively short time to prepare from them, food or beverage for consumption, these so-called "instant" products, together with commonly powdered, granulated, or loose materials such as tea, sugar, and flour, introduce an increasing load of measuring and dispensing operations into the everyday preparation of an ordinary home meal. As such operations multiply, convenience achieved through the use of "instant" foods is reduced or lost unless steps are taken to efficiently and conveniently accomplish these operations.

A general object of my invention, therefore, is to provide a device for storing bulk quantities of loose material such as "instant" food preparations and for measuring and dispensing desired amounts of the stored material. Another object is to provide such a device which measures and dispenses the desired quantities with a high degree of convenience, accuracy, and economy, heretofore unknown.

With respect to convenience, a further object is to provide a device in which storage, measuring, and dispensing means are effectively combined for ease of operation; which may be stored and used in the same readily available location; which permits a wide range of measured quantities to be selected and dispensed, thereby eliminating the necessity for a correspondingly large number of separate measuring spoons or other containers and which accomplishes its functions virtually automatically.

Further, an object of this invention is to provide apparatus which dispenses, time after time, preselected and accurately measured amounts. Consistent measuring accuracy in food preparation produces a highly desirable uniformity of result.

A further object is to reduce waste and lost material that is ordinarily experienced in handling, measuring, and dispensing loose material from separate storage containers by various and separate measuring devices.

While the objects of my invention set forth above are stated in terms of the convenience, accuracy, and economy it provides in the dispensing of "instant" food preparations in the home, my invention is not limited to use with such materials or only in the home. References above and those which follow to embodiments of my invention for use with home food preparation are merely for the purpose of illustration. The invention may be enjoyed to its full advantage in connection with the storage, measuring, and dispensing of any powdered, pulverized, granulated, or other dry loose form of material in the home, laboratory, or any other place where the convenient and efficient accomplishment of such functions is desirable.

The means and manner of accomplishing the foregoing objects together with other objects and advantages of my invention will become apparent from the following description of a preferred embodiment thereof together with the accompanying drawings in which:

FIGURES 1 and 2 are isometric right and left front quarter views of an automatic measuring and dispensing canister;

FIGURE 3 is an isometric view of the major components of the operating mechanism of the canister shown in FIGURES 1 and 2; the mechanism is shown in its nonoperated storage and refilling position and with some parts partially sectioned or broken away to more fully reveal important aspects of the invention;

Figure 4:
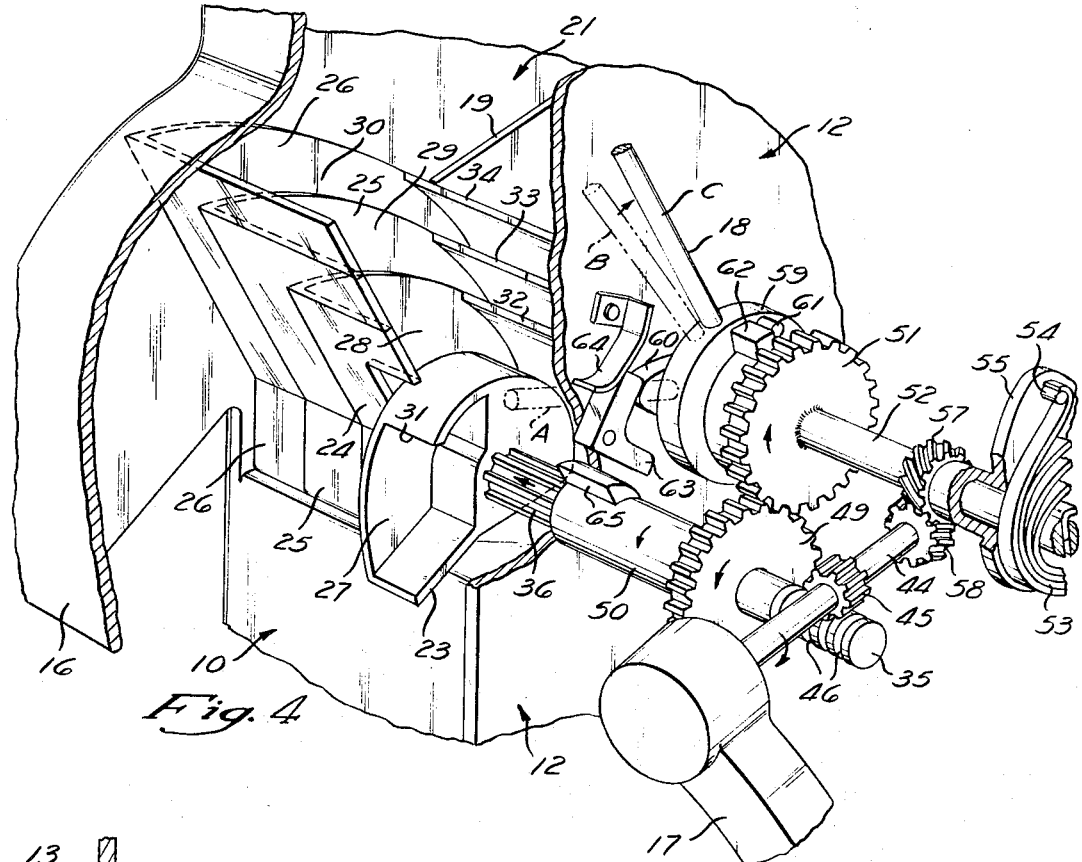
FIGURE 4 is similar to FIGURE 3 except that the mechanism is shown in its operated or dispensing position.

As shown in FIGURES 1 and 2, my invention takes the form of a substantially fully enclosed combined measuring and dispensing container or canister able to stand on a kitchen countertop, for example, for convenient and ready use. While the enclosure may take other forms than that shown in the drawings, the enclosure shown comprises front and back walls and two main side walls, indicated generally by the numerals 10, 11, 12, and 13, respectively. A fill opening in top 14 of the device is closed by a hinged door 15. Material stored in the container is dispensed generally downwardly and outwardly from and through a downwardly facing hooded chute 16 in a manner to be described more fully below.

The operating controls shown in FIGURES 1 and 2 include a selection handle 17 operated to determine the measure of material to be dispensed and an operating handle 18 for controlling the dispensing operation and restoring the operating mechanism to its refilling and storage position following the dispensing operation. As will be explained more fully below, a manually operated elevator 19 having an operating handle 20 appearing on the outside of the enclosure may be provided within the storage part of the device.

A major part of the space within the enclosure as shown in FIGURES 1 and 2 is devoted to a storage chamber, indicated generally by the numeral 21, for storing the material to be dispensed. The fill opening door 15 opens into the top of storage chamber 21. The measuring and dispensing mechanisc and apparatus, indicated generally by the numeral 22 in FIGURES 1 and 2 and shown in enlarged scale and detail in the other figures of the drawings, stands in and closes a dispensing opening at a lower point in storage chamber 21. Material thus can be fed to the mechanism by gravity or by other suitable means such as hand-operated elevator scoop 19 as shown in FIGURE 2.

FIGURE 3 shows the operating mechanism which accomplishes the dispensing of measured amounts of dry loose material from storage chamber 21 and out through chute 16. In FIGURE 3, the mechanism is oriented substantially as shown in FIGURE 1, but much of the hooded chute 16, front wall 10, and side wall 12 have been broken away to reveal the operating mechanism they otherwise enclose and conceal.

Major components of the measuring and dispensing mechanism are a number of more or less semi-cylindrical measuring and dispensing elements 23, 24, 25, and 26, nested together and mounted in and closing the dispensing opening in front wall 10 of the storage chamber 21. The measuring and dispensing elements are generally semi-cylindrical, but preferably extend through a little more than 180°. They are of graduated lengths and have partially hollow sectors open at one end, permitting them to be nested as shown within the overall length of element 26, the longest element. When nested, an unoccupied space or cavity remains and is associated with each element, though it is partially defined by two adjacent elements. For example, element 23 is provided with a cavity 27; element 24, with cavity 28 defined by adjacent elements 23 and 24; element 25, with cavity 29 defined by adjacent elements 24 and 25; and element 26, with cavity 30 defined by elements 25 and 26.

Each cavity has an opening in one side facing radially outwardly of its element. The rear side of each such opening, as viewed in the drawings, is the edge of a forwardly extending wall partially defining its cavity. The forwardly extending walls, which are a part of cavities 27–30, are identified by numerals 31–34, respectively. Their further purpose and function will be explained below.

The measuring and disepnsing elements 23–26 are supported by and mounted for rotation on a shaft 35 between a refilling and storage position with their cavity openings facing into storage chamber 21 as all are shown in FIGURE 3 and a dispensing position with their cavity openings facing into chute 16 as illustrated in FIGURE 4 by measuring and dispensing element 23. As explained more fully below, various preselected combinations of the dispensing elements may be rotated into the dispensing position during the dispensing operation to thereby dispense material from the storage chamber into the chute in various amounts as measured by the cavities in the elements.

Shaft 35, upon which measuring and dispensing elements 23–26 are mounted for rotation, is supported with its axis generally horizontal by side walls 12 and 13 of the apparatus. Shaft 35 is supported by these walls for axial displacement as well as rotation. As shown most clearly in FIGURE 5, shaft 35 is provided with axially extending interrupted splined portions 36, 37, and 38 adapted to engage cooperating and appropirately spaced axial portions of internally grooved cylindrical bores 40, 41, 42, and 43 passing through dispensing elements 23, 24, 25, and 26, respectively. The axially extending portions of shaft 35 between the splined portions are of reduced external diameter and the like portions of the bores through elements 23–26 are of enlarged internal diameter. The axial displacement of shaft 35, therefore, determines which of the dispensing elements will be keyed for rotation with the shaft and which of the dispensing elements will remain stationary and permit the free rotation of the shaft through them.

Figure 5:
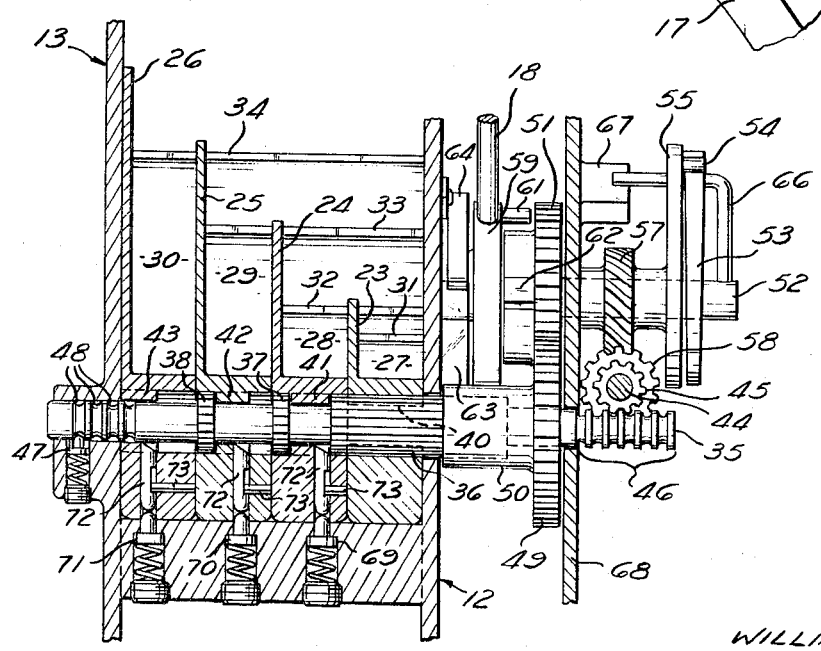
FIGURE 5 is a longitudinal section in the plane of line 5—5 of FIGURE 3 and through the operating mechanism shown in FIGURES 3 and 4, revealing additional details of construction.

The positioning of shaft 35 aixally is accomplished by rotation of selection handle 17 which turns a cross shaft 44. Cross shaft 44 is supported with its axis normal to the axis of shaft 35 and mounted for rotation about its own axis and restrained against axial displacement. The means for supporting cross shaft 44 and permitting and preventing the various motions described can be by conventional journals and shaft collars. These have been omitted from the drawings, however, so that the more novel and less conventional elements and operation of the mechanism may be shown as clearly as possible. Cross shaft 44 is provided with a spur gear 45 fixed to it and having gearing engagement with a series 46 of parallel circular grooves in the adjacent portion of shaft 35. It will be apparent that clockwise rotation of cross shaft 44 rotates spur gear 45, driving shaft 35 to the left as seen in FIGURES 3, 4, or 5 and as indicated by arrows in FIGURE 4. Counterclockwise rotation of cross shaft 44 will, of course, move shaft 35 to the right.

The selective engagement of shaft 35 with successive ones of measuring and dispensing elements 23–26 can best be described by reference to FIGURE 5 of the drawings. In the position of axial displacement shown, splined portion 36 of shaft 35 is in engagement with the internally grooved cylindrical bore portion 40 of element 23, keying the latter to shaft 35. The remaining splined portions on shaft 35 are free of engagement with the internally grooved bore portions of the other elements 24–26 so that shaft 35 rotates free of them.

Axial displacement of shaft 35 to the left of its position seen in FIGURE 5 brings the shaft to a position or location in which splined portion 36 and grooved bore portion 41 of dispensing element 24 are in keying interengagement. Splined portion 36 remains engaged with grooved bore portion 40 of dispensing element 23 so that rotation of shaft 35 in this axial position rotates both measuring and dispensing elements 23 and 24. Elements 25 and 26 remain out of keying engagement with shaft 35 when it is in this axial position so that shaft 35 still rotates free of them.

Further axial displacement of shaft 35 to the left as viewed in FIGURE 5 brings splined portion 37 and grooved bore 42 in keying intereengagement. Rotation of shaft 35 now rotates measuring and dispensing elements 23, 24, and 25. Element 26 is not keyed to shaft 35 and remains stationary when the shaft is rotated.

Finally, further leftward axial displacement of shaft 35 brings splined portion 38 and grooved bore portion 43 of element 26 into keyed interengagement. Rotation of shaft 35, when in this position of axial displacement, rotates all measuring and dispensing elements 23–26 with it.

In connection with the axial displacement of shaft 35, I prefer that means be provided to indicate particular axial locations corresponding to the keying engagement of various ones of the dispensing elements for rotation with shaft 35. Such means may comprise, for example, a spring-loaded detent 47 and a series 48 of cooperating annular grooves shown on the left end of shaft 35 in FIGURE 5. Any other means suitable for accomplishing this purpose may be employed, of course.

Also mounted on shaft 35 outwardly of side wall 12 is spur gear 49. Spur gear 49 has a long integral bushing 50 having an internally grooved cylindrical bore and is keyed to shaft 35 by engagement with its splined portion 36. This spline arrangement provides a driving connection and permits relative axial displacement of shaft 35 with respect to spur gear 49. It will be noted, however, that, although various of the dispensing elements 23–26 are engaged and disengaged for rotation with shaft 35 in accordance with its various positions of axial displacement, spur gear 49 is always keyed to shaft 35 and has, at all times, a driving connection therewith.

From the foregoing, it will be apparent that generally counterclockwise rotation of shaft 35, as it appears in FIGURES 3 and 4 and as shown by the superimposed arrow in FIGURE 4, will also rotate forwardly or counterclockwise all of those measuring and dispenisng elements 23–26 keyed to shaft 35. The number of measuring and dispensing elements rotating forwardly depends in turn upon the axial position of shaft 35 as selected through selection handle 17. Thus, rotation of shaft 35 rotates selected ones of the measuring and dispensing elements from their refilling and storage position to their dispensing position and axial displacement of shaft 35 selects the measuring and dispensing elements to be rotated.

Spur gear 49 driving shaft 35 is in turn driven by means of another spur gear 51 fixed on powered shaft 52 rotated by energy stored in clock spring 53. Clock spring 53 has its inner end bent and held in the split end of shaft 52, and its outer end formed to hook against pin 54 of rotatable tensioning plate 55. Tensioning plate 55 has a bushing 56 extending axially from its face opposite clock spring 53. Bushing 56 terminates in a helical gear 57 engaging a mating gear 58 keyed on cross shaft 44 for rotation therewith. Tensioning plate 55, bushing 56, and gear 57 are all mounted for rotation together on powered shaft 52 passing through them.

Depending upon the angular position of rotation of tensioning plate 55 about the split end of shaft 52, clock spring 53, hooked on pin 54 and held in shaft 52, has more or less tension and energy stored in it. The amount of tension is adjusted by rotation of tensioning plate 55 relative to shaft 52. This is accomplished by the turning of cross shaft 44 and, in turn, mating gears 57 and 58 and bushing 56. The pitch of the gears 57 and 58 and the direction of the spiral of spring 53 is such that clockwise rotation of cross shaft 44 as indicated by the superimposed arrow in FIGURE 4 will tighten the spiral of spring 53, increasing its tension and the energy stored in it. The advantage of this particular arrangement will be explained below following the description of the remainder of the operating mechanism.

The tension of clock spring 53 is also varied by rotation of shaft 52 relative to tensioning plate 55. The angular position of plate 55 is determined and maintained by the position of cross shaft 44 and selection handle 17. Tensioning plate 55 and selection handle 17 move together and stand still together. Shaft 52 is rotated counterclockwise and in a direction increasing the tension in clock spring 53 by pulling operating handle 18 down as described more fully below. Any tension wound into clock spring 53 by angular displacement of tensioning plate 55 or powered shaft 52 or both tends to turn shaft 52 and gear 51 fastened on it and gear 49 and shaft 35 to which it is keyed in the respective directions indicated by the arrows on them in FIGURE 4. Rotation of main operating shaft 35 in the direction indicated will move all of the measuring and dispensing elements 22–26 that are keyed to it toward their dispensing position and away from their refilling and storage position. Thus, release of energy stored in clock spring 53 when it is wound up imparts the dispensing motion to the selected ones of the measuring and dispensing elements.

Handle 18 is fastened to a collar 59 mounted for free rotation on powered shaft 52. A radially protruding cam 60 is fixed to one side face of collar 59 for rotation with it. A pin 61 extends axially away from the opposite side of collar 59 toward spring 53 from a point radially away from shaft 52. Up and down motion of handle 18 thus moves collar 59 back and forth and cam 60 and pin 61 with it. As mentioned above, pulling operating handle 18 down to its position A shown in phantom in FIGURE 4 winds up clock spring 53.

Pin 61 on collar 59 cooperates with a radially extending lug 62 fastened to the side of gear 51 for rotation with it and with powered shaft 52. Rotation of gear 51 and lug 62 as indicated by the arrow on gear 51 in FIGURE 4 releases tension in clock spring 53 and dumps the selected dispensing elements. The mechanism is thus shown in FIGURE 4 with the spring 53 in a low-tension condition and measuring and dispensing element 31 in its dispensing position. Lug 62 is against pin 61 on operating handle collar 59. When handle 18 is moved downwardly from its position C in FIGURE 4, pin 61 will engage and push lug 62, gear 51 and shaft 52 in a counterclockwise direction (opposite arrow on gear 51) and wind up clock spring 53. Also, main operating shaft 35 through gears 51 and 49 will rotate clockwise (opposite arrow on gear 49) and return measuring and dispensing element 31 to its refilling and storage position shown in FIGURES 3 and 5.

The tension wound into clock spring 53 by moving the handle 18 downwardly to its position A is held by cooperation of an angle lever 63 pivotally mounted to side wall 12 and biased by leaf spring 64 into engagement with a radially projecting lug 65 on bushing 50 attached to gear 49. As shown in FIGURE 3, clock spring 53 is wound up and lug 62 of gear 51 and lug 65 of gear 49 are directed generally toward each other. The tension in spring 53 tends to rotate lug 62 clockwise and lug 65 counterclockwise through engagement of gears 49 and 51, but the spring is restrained from doing so by angle lever 63 standing in the way of lug 65. Thus, angle lever 63 keeps the whole interconnected mechanism in the train of gear 49 from unwinding and dispensing stored material.

The stored energy of spring 53 is released by moving operating handle 18 upwardly from its position B shown in full line in FIGURE 3 and in phantom in FIGURE 4 so that cam 60 is moved up and into engagement with angle lever 63. Cam 60 moves lever 63 against the bias of spring 64 and out of blocking engagement with lug 65. The train of gears is unlocked and each moves in the direction indicated by the arrows in FIGURE 4 and comes to rest in the positions as shown in FIGURE 4. As shown therein, measuring and dispensing element 23 is rotated by shaft 35 to its dispensing position, lug 65 is released by and rotated beyond angle lever 63, lug 62 has moved around to or nearly to engagement with pin 61 on operating handle collar 59, and spring 53 is more or less unwound. The extent to which the mechanism "unwinds" when the tension in spring 53 is released is limited by engagement of stop bar 66 with a fixed stop block 67. Block 67 is shown mounted on a secondary side wall 68 in FIGURE 5. Wall 68 also supports shafts 35 and 52 for rotation. Shaft 35 is permitted axial displacement through wall 68. Wall 68 has been omitted from FIGURES 3 and 4 for clarity and simplification of the graphical presentation, but its relationship to the other elements of the device is clearly shown in FIGURE 5.

Earlier, the tension adjustment of clock spring 53 by rotation of selection handle 17 and tensioning plate 55 was explained. The relationships are such that, as selection handle 17 is moved to key more of the measuring and dispensing elements 23–26 to shaft 35, tensioning plate 55 is rotated through gears 57 and 58 to a tension increasing position. This relationship is maintained automatically by cross shaft 44 and is highly advantageous and a feature I prefer to include in devices embodying my invention. This tension adjustment arrangement automatically provides for additional power for rotating the dispensing elements to their dispensing positions as more elements are preselected for rotation and the load including friction is increased. The feature contributes to the smooth and effective operation of the apparatus. The rate of increase in the tension wound into spring 53 by rotation of tensioning plate 55 can also be controlled by tapering the spring 53 so that the most desirable force-displacement characteristic may be utilized.

Another feature of my invention which contributes to the smooth and trouble-free operation of the embodiment described above comprises spring-biased detents 69, 70, and 71 mounted below measuring and dispensing elements 24, 25, and 26, respectively. As shown in FIGURE 5, each detent is urged into the end of a small radial bore extending toward the internally grooved cylindrical central bore of its dispensing element. Each small radial contains a sliding release pin 72 having an upper beveled end extending into the central bore of the dispensing elements. The opposite and lower ends of release pins 72 engage their respective detent. The sliding movement of release pins 72 is limited by cross locking pins 73 extending into flat relieved portions on the sides of release pins 72. The detent and release mechanism is clearly shown in FIGURE 5.

Spring-loaded detents 69–71 each restrain rotation of the dispensing element with which they are associated unless pushed downwardly by a release pin 72 when the latter is depressed by a splined portion of shaft 35 sliding axially into engagement with and over it. The detents 69–71 and their cooperating release pins 72 are so arrnaged in their associated dispensing elements with respect to the splined portions of shaft 35 that axial displacement of shaft 35 releases by depressing engagement of a release pin 72 only those feasuring and dispensing elements selected for rotation. The remaining dispensing elements remain engaged by their detents and resist any tendency to rotate. This arrangement of detents provides very positive action by permitting higher spring tensions for rotation of the selected dispensing elements than might otherwise be used. If the dispensing elements are snapped open in the positive manner I prefer, the drag of the sealing fit between adjacent dispensing elements tends to inadvertently dump those dispensing elements not activated and not keyed to shaft 35 and that are adjacent an activated dispensing element. Spring-loaded detents 69–71 prevent this.

The operation is described above in connection with pertinent descriptions of the structure and mechanism. Generally, it should be explained that material to be dispensed from the apparatus is put into storage chamber 21 through hinged door 14 in the top of the enclosure. The material falls down into chamber 21 and fills upwardly facing cavities 27–30 in the measuring and dispensing elements 23–26 positioned in their refill and storage position as shown in FIGURE 3.

When a measured amount of the contents is to be dispensed, selection handle 17 is positioned to axially displace main operating shaft 35 into engagement with one, two, three, or all four of the dispensing elements. Shaft 35 is always keyed to dispensing element 23. Spring-loaded detent 47 and the series 48 of grooves in shaft 35 provide a convenient "feel" and click indicating the predetermined positions of engagement with successive dispensing elements.

The cavities 27–30 in measuring and dispensing elements 23–26 are sized to hold predetermined volumes or measures of the material to be dispensed. Any convenient measures may be chosen. For example, teaspoon, tablespoon, cup, or fractions thereof may be used. The invention is not limited to any particular measures and comprehends conventional amounts as well as special volumes useful in a particular job or process.

In order to dispense the preselected measured amount, operating handle 18 is moved from its idle position B shown in phantom in FIGURE 4 to dispensing position C, also as shown in FIGURE 4. In the manner described above, angle lever 63 is cammed into its tension-releasing position (FIGURE 4) and the mechanism springs into action and rotates the preselected ones of the measuring and dispensing elements forwardly to a dispensing position. In FIGURE 4, dispensing element 23 is shown in this position. The dispensing of the precise amount desired is insured by the scooping action of the scoop wall on the rearward side of the opening in each dispensing element cavity. As the desired elements are rotated, they are full of material to be dispensed and the scoop wall cuts and scoops out a precise amount of material as rotational motion is imparted to the preselected dispensing element. As the dispensing element rotates forwardly, storage chamber 21 is sharply cut off from communication with the cavity in the rotating element as its scoop wall meets the side of the dispensing opening in the storage chamber as defined by the intersection of chute 16 and front wall 10. The sharp positive action of the dispensing elements in moving to their dispensing position thus contributes to the high degree of accuracy in measurement able to be achieved by devices embodying my invention. Also, the material to be dispensed is firmly dumped and dispensed by this action. Hooded chute 16 insures that it is confined and directed in a desired direction should it tend to be dispersed.

The operated measuring and dispensing elements are returned to their refill and storage position and clock spring 53 wound up and tensioned by moving operating handle from position C down to position A, these positions being indicated in FIGURE 4. All measuring and dispensing elements are then brought to their refill and storage position and are refilled in preparation for the next dispensing operation. The refilling may be aided, if desired, by a device such as elevator 19 moved up and down by handle 20 shown in FIGURE 2.

From the foregoing description, it will be apparent that my invention provides a novel and useful means for conveniently storing and automatically dispensing from storage accurately measured amounts of loose dry material without waste and in preselected quantities.

Those skilled in the art will appreciate that various changes and modifications can be made in the apparatus described herein without departing from the spirit and scope of the invention.

I claim:

1. Apparatus for dispensing a preselected one of a number of measured amounts of loose dry material from a stored in-bulk quantity thereof comprising
   a walled storage chamber for containing and storing an in-bulk quantity of loose dry material to be dispensed and having a dispensing opening therein,
   a plurality of movable measuring and dispensing elements each having a cavity with an opening therein and each sized to hold a predetermined amount of material when filled to its opening, all of said measuring and dispensing elements being mounted in said dispensing opening in said storage chamber for closing said dispensing opening and for the rotational motion of each about a common axis and between a filling position with its cavity opening facing into and in communication with said walled storage chamber and a dispensing position with its cavity opening facing outside said walled storage chamber for delivery of its measured contents,
   means for selecting one alone and in combination with all of said measuring and dispensing elements to be rotated from its filling position to its dispensing position,
   operating means for rotating the selected ones of said measuring and dispensing elements from filling to dispensing positions for delivery of a preselected measured amount of dry loose material from the in-bulk quantity stored in said walled storage chamber and for rotating the selected ones of said measuring and dispensing elements from dispensing to filling positions for refilling said cavities therein in preparation for the next dispensing operation.

2. The apparatus of claim 1 in which said measuring and dispensing elements have cavities of graduated sizes which may be preselected in combinations by said selecting means and rotated together by said operating means to dispense the combined amounts of their cavities.

3. The apparatus of claim 1 in which said operating means includes pre-tensioned spring means for moving said elements from their filling to dispensing positions and manually operated means for moving said elements from their dispensing to filling positions and for re-tensioning said spring means.

4. The apparatus of claim 1 in which
   said measuring and dispensing elements are lined up side by side for rotation about and with said common axis passing through them and each of said elements have a bore coaxial with said common axis of rotation, said bore of each of said elements having an internally axially grooved portion of limited axial extent,
   and in which said operating means includes a rotatable operating shaft coaxial with said axis of rotation of said elements and movable axially through said bores of said elements, said shaft having axially interrupted splined portions adapted to interengage said internally grooved bore portions of said elements at predetermined positions of axial displacement of said shaft and to thereby establish a torque transmitting driving connection between said shaft and the interengaged ones of said elements,
   and which also includes means for axially displacing said shaft to and between said predetermined positions of axial displacement and to thereby selectively interengage splined portions of said shaft and grooved portions of said bores,
   whereby rotation of said shaft rotates only said measuring and dispensing elements so interengaged with said shaft and said elements out of interengagement with said shaft stand still.

5. The apparatus of claim 4 in which said operating means includes pre-tensioned spring means operatively connected to said operating shaft for moving said selected ones of said elements from their filling to dispensing positions and also includes manually operated means operatively connected to said operating shaft and said spring means for moving said elements from their dispensing to their filling positions and for re-tensioning said spring means.

6. The apparatus of claim 4 in which said pre-tensioned spring means includes adjusting means for varying the amount of pre-tension therein.

7. The apparatus of claim 6 in which said spring tension adjusting means is operatively connected with said selecting means whereby the tension in said spring means is adjusted to vary directly with the number of said plurality of measuring and dispensing elements to be moved by said spring means.

8. The apparatus of claim 7 in which said spring means comprises a tapered clock spring.

9. The apparatus of claim 4 together with means for providing increased resistance to the axial motion of said operating shaft at its said predetermined positions of axial displacement.

10. The apparatus of claim 4 in which said plurality of measuring and dispensing elements comprise generally semi-cylindrical forms of graduated lengths and having an axis, said elements being substantially hollow and each having a flat bottom wall and semi-cylindrical and flat side walls, said elements being nested together in a side-by-side relation with the longest of said elements generally containing the others and with their axes aligned and parallel to said common axis of said rotation, said elements together defining cavities of predetermined volume, all of said cavities having openings for receiving material to fill them when said elements are in their filling position and for delivering material when said elements are in their dispensing position.

11. The apparatus of claim 10 in which said openings associated with said elements each have a side formed by one edge of a cylindrically shaped side wall which scoops and carves out of said storage chamber of material a full and substantially the same measure of material during each dispensing operation of its associated element.

12. The apparatus of claim 4 including a spring-biased detent means associated with each of said measuring and dispensing elements and receiving means in each of said elements into which said detent means are spring urged to tend to hold said element in a predetermined position of rotation and release means carried in and associated with each of said elements and engageable by the entry of one of said splined portions of said operating shaft into the internally grooved bore portion of its associated element and to a position over and depressing said release means, said release means being depressed into engagement with said detent means to depress said detent means out of said receiving means and against said spring bias to release its associated element from the holding tendency of said detent means.

References Cited

UNITED STATES PATENTS

| | | | |
|---|---|---|---|
| 1,568,764 | 1/1926 | Nizamis | 221—271 X |
| 2,655,291 | 10/1953 | Roundtree | 222—276 X |

SAMUEL F. COLEMAN, *Primary Examiner.*